Aug. 17, 1965
K. MÜLLER
3,200,704
TRIPLET LENS OBJECTIVE
Filed May 11, 1964
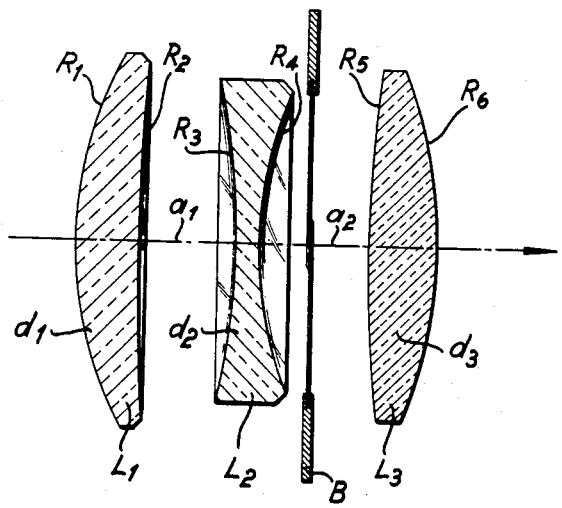
INVENTOR
KARL MÜLLER
BY Blum, Moscovitz,
Friedman & Blum
ATTORNEYS

United States Patent Office 3,200,704
Patented Aug. 17, 1965

3,200,704
TRIPLET LENS OBJECTIVE
Karl Müller, Grone, near Gottingen, Germany, assignor to Voigtlander A.G., Braunschweig, Germany, a corporation of Germany
Filed May 11, 1964, Ser. No. 367,285
Claims priority, application Germany, Feb. 5, 1960, V 11,240
5 Claims. (Cl. 88—57)

This application is a continuation-in-part of my copending application Ser. No. 86,143, filed January 31, 1961, now abandoned.

This invention relates to objectives or lens systems for photography and projection and, more particularly, to an improved triplet lens objective of high light transmitting power, having an aperture ratio of substantially 1:2.8 and a structural length substantially equal to the diameter of the light admitting aperture.

Objective lenses of this type, having a physical length ranging from 80 percent to 120 percent of the diameter of the light admitting aperture, are known to the prior art in a number of forms. Such objectives utilize lenses of either medium-high density glass or very high density glass. The objectives having lenses of very high density glass have a photographic efficiency which is higher than those utilizing lenses of a medium-high density glass, when comparing equivalent arrangements, but those using lenses of very high density glass are uneconomical, in many applications, owing to the relatively high cost of such glass.

To meet these objections, the present invention provides a triplet lens objective which has a very much higher photographic efficiency than triplet lens objectives having lenses made of glass of intermediate density, while having a cost of the order of triplet objectives having lenses made of glass of such intermediate density and much less than the cost of triplet objectives having lenses made of very high density glasses.

More particularly, the triplet lens objective of the present invention comprises, in the direction of light rays through the objective proceeding from the longer conjugate to the shorter conjugate, a condensing meniscus lens followed by a bi-concave dispersion lens, adjacent and in front of the diaphragm, with the objective being completed by a bi-convex condenser lens having surfaces of unequal curvature and with its more sharply curved outer surface facing toward the shorter conjugate.

The front meniscus lens is formed with a concave inner surface, facing the diaphragm, having a radius of from 6.5 to 12.5 times the equivalent focal length of the objective.

The glasses used in the several lenses have refraction indices such that the arithmetical mean value of the three refraction indices is between 1.65 and 1.70. The mean arithmetical value of the Abbe indices $v$ of the three lenses is between 40 and 46. The two condenser lenses, furthermore, are made of dense baryta glass, and the sum of the mean color dispersion of the two condenser lenses $(\delta n_1 + \delta n_3 = \delta n^+)$ plus the mean dispersion of the negative lens $(\delta n_2 = \delta n^-)$, or $\delta n^+ + \delta n^-$, lies between 0.046 and 0.0518, while the corresponding difference, or $\delta n^+ - \delta n^-$, is less than 0.0033.

For an understanding of the principles of the invention, reference is made to the following description of a typical embodiment thereof as illustrated in the accompanying drawing in which the single figure is an axial sectional view, drawn to scale, of a triplet lens objective embodying the invention.

For the purpose of providing a specific example of a triplet lens objective or lens system embodying the invention, and with reference to the lens system or objective shown in the drawing, the following table gives a set of physical values applicable to this particular example, based, for convenience, upon a focal length of 100 millimeters (mm.). However, it should be understood that this specific example is by no means limiting, and that the invention may be embodied in lens systems or objectives having optical data differing from those of the specific example but falling within the scope of the appended claims.

NUMERICAL EXAMPLE

[$f$=100 mm. 1:2.8. Field angle=47°]

| Lens $L_1$ | | | |
|---|---|---|---|
| $R_1 = +38.4537$ mm. | $d_1 = 6.47945$ mm. | $n_1 = 1.67000$ | $\nu_1 = 48.13$ |
| $R_2 = +942.116$ mm. | $a_1 = 9.15967$ mm. | | |
| Lens $L_2$ | | | |
| $R_3 = -67.6785$ mm. | $d_2 = 2.37644$ mm. | $n_2 = 1.70445$ | $\nu_2 = 29.84$ |
| $R_4 = +38.9151$ mm. | $a_2 = 10.43249$ mm. | | |
| Lens $L_3$ | | | |
| $R_5 = +149.969$ mm. | $d_3 = 6.40254$ mm. | $n_3 = 1.64650$ | $\nu_3 = 47.50$ |
| $R_6 = -45.7984$ mm. | | | |

In the above table, L indicates the lenses, R the radii of the lens surface, $d$ the thickness of the lenses measured along the optical axis of the triplet, $a$ the air space between the lenses measured along the optical axis of the triplet, B the diaphragm, $n$ the refractive indices of the lenses for the green $e$-line of the mercury, $\nu(=nu)$ representing the Abbe index $\nu$ as a quotient of the refraction index of the $e$-line minus I and the base dispersion $n'_F - n'_C$.

The overall physical length of the objective $(1 = d_1 + a_1 + d_2 + a_2 + d_3)$ is $1 = 34.85059$ mm. The arithmetical mean of the $\nu$ values is 41.823. The glasses used correspond, in sequence, to the following glass types of the Jenaer Glaswerk Schott & Gen Mainz, Germany:

BaF11 for the lens $L_1$,
SR15 forthe lens $L_2$,
BaF9 for the lens $L_3$.

with the corresponding dispersions for the red C' line and blue F' line of cadmium being:

0.01392 for BaF11,
0.02361 for SF15 and
0.01361 for BaF9.

For the frequently used refractive index $n_d$ for the $d$-line of the helium spectrum, these glasses have, in the same sequence, the corresponding refraction index for yellow light: 1.6667 for BaF11, 1.6989 for SF15, and 1.6433 for BaF9.

The arithmetic mean of all refractive indices for green light $n_e$ is therefore 1.67365, while, from the $n_d$-values above, the mean for the yellow helium line is 1.669633. The average dispersions referred to the $\nu_e$ value give 0.05114 as the total of the dispersions of the objective of the invention, which is unequivocally smaller than 0.0518. From these values there is also obtained a difference of dispersions of 0.00392, which is unequivocally greater than 0.00330.

I claim:

1. A high light transmitting power objective consisting of three serially arranged coaxial and axially spaced lenses including, in the direction of light rays entering the objective from the side of the longer conjugate for the side of the shorter conjugate, a condensing meniscus lens having a concave surface facing in the direction of the shorter conjugate, a bi-concave dispersion lens, and a bi-convex condenser lens having surfaces of different curvature with the more sharply curved outer surface facing in the direction of the shorter conjugate; the objective having the following characteristics as related to a focal length of $f=100$ millimeters:

| Lens $L_1$ | | | |
|---|---|---|---|
| $R_1=+38.5$ mm. $R_2=+942.1$ mm. | $d_1=6.5$ mm. $a_1=9.2$ mm. | $n_1=1.670$ | $\nu_1=48.1$ |
| Lens $L_2$ | | | |
| $R_3=-67.7$ mm. $R_4=+38.9$ mm. | $d_2=2.4$ mm. $a_2=10.4$ mm. | $n_2=1.704$ | $\nu_2=29.8$ |
| Lens $L_3$ | | | |
| $R_5=+150.0$ mm. $R_6=-45.8$ mm. | $d_3=6.4$ mm. | $n_3=1.647$ | $\nu_3=47.5$ |

2. A high light transmitting power objective as claimed in claim 1 in which the two condensing lenses comprise high density baryta glass.

3. A high light transmitting power objective as claimed in claim 1 in which the sum of the mean color dispersions of the two condenser lenses ($\delta n_1 + \delta n_3 = \delta n^+$), plus the mean color dispersion of the negative lens ($\delta n_2 = \delta n^-$), is between 0.046 and 0.058, and the difference between the sum of the mean color dispersions of the two condenser lenses ($\delta n^+$) and the mean color dispersion of the negative lens ($\delta n^-$), is less than 0.0058.

4. A high light transmitting power objective as claimed in claim 4 in which the two condensing lenses comprise high density baryta glass.

5. A high light transmitting power objective as claimed in claim 3 in which the inside radius of the front condensing meniscus length is from 6.5 to 12.5 times the equivalent focal length of the objective.

References Cited by the Examiner

Schlegel, German application Serial No. 03857, printed May 9, 1956.

JEWELL H. PEDERSEN, *Primary Examiner.*

JOHN K. CORBIN, *Examiner.*